United States Patent
Ye et al.

(10) Patent No.: US 12,394,226 B2
(45) Date of Patent: Aug. 19, 2025

(54) METHOD OF TRAINING VIDEO TAG RECOMMENDATION MODEL, AND METHOD OF DETERMINING VIDEO TAG

(71) Applicant: BEIJING BAIDU NETCOM SCIENCE TECHNOLOGY CO., LTD., Beijing (CN)

(72) Inventors: Zhi Ye, Beijing (CN); Xin Tang, Beijing (CN); Hewei Wang, Beijing (CN); Li Ge, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/920,966

(22) PCT Filed: May 31, 2022

(86) PCT No.: PCT/CN2022/096229
§ 371 (c)(1),
(2) Date: Oct. 24, 2022

(87) PCT Pub. No.: WO2023/273769
PCT Pub. Date: Jan. 5, 2023

(65) Prior Publication Data
US 2024/0221401 A1    Jul. 4, 2024

(30) Foreign Application Priority Data
Jul. 1, 2021    (CN) .......................... 202110754370.4

(51) Int. Cl.
*G06V 20/70*    (2022.01)
*G06V 10/44*    (2022.01)
(Continued)

(52) U.S. Cl.
CPC .............. *G06V 20/70* (2022.01); *G06V 10/44* (2022.01); *G06V 10/806* (2022.01); *G06V 20/49* (2022.01)

(58) Field of Classification Search
CPC ........ G06V 20/70; G06V 20/46; G06V 10/80; G06V 10/803; G06V 10/809; G06V 10/84;
(Continued)

(56) References Cited

U.S. PATENT DOCUMENTS

| | | | |
|---|---|---|---|
| 8,533,134 B1 * | 9/2013 | Zhao | G06F 16/35 706/12 |
| 8,706,675 B1 * | 4/2014 | Samaniego | G06Q 30/0251 706/52 |

(Continued)

FOREIGN PATENT DOCUMENTS

| | | |
|---|---|---|
| CN | 108694217 | 10/2018 |
| CN | 111107435 | 5/2020 |

(Continued)

OTHER PUBLICATIONS

Shen Z, Wang F, Dai J. Weakly supervised temporal action localization by multi-stage fusion network. IEEE Access. Jan. 20, 2020;8: 17287-98. (Year: 2020).*

(Continued)

*Primary Examiner* — Oneal R Mistry
*Assistant Examiner* — Duy Tran
(74) *Attorney, Agent, or Firm* — PILLSBURY WINTHROP SHAW PITTMAN, LLP

(57) ABSTRACT

The present disclosure provides a method of training a video tag recommendation model, a method of determining a video tag, an electronic device, and a storage medium. The video tag recommendation model includes a video feature extraction network and a tag feature extraction network. The (Continued)

method of training the video tag recommendation model includes: obtaining a first video feature of a video sample by using the video feature extraction network; inputting a first tag as a positive sample to the tag feature extraction network, so as to obtain a first feature of the first tag; inputting a second tag as a negative sample to the tag feature extraction network, so as to obtain a second feature of the second tag; and training the video tag recommendation model according to the first video feature, the first feature, the second feature, and a predetermined loss function.

20 Claims, 9 Drawing Sheets

(51) Int. Cl.
*G06V 10/80* (2022.01)
*G06V 20/40* (2022.01)

(58) Field of Classification Search
CPC ...... G06V 10/44; G06V 10/443; G06V 10/40; G06V 10/22; G06V 10/74; G06V 10/778; G06V 10/96; G06V 20/41; G06V 20/49; G06V 2201/07; G06T 2207/10016; G06T 2207/30221
See application file for complete search history.

(56) References Cited

U.S. PATENT DOCUMENTS

| | | | | |
|---|---|---|---|---|
| 2012/0123978 | A1* | 5/2012 | Toderice | G06V 20/70 706/12 |
| 2019/0258671 | A1* | 8/2019 | Bou | G06F 16/7867 |
| 2020/0057935 | A1* | 2/2020 | Wang | G06F 17/15 |
| 2020/0394416 | A1* | 12/2020 | Gong | G06V 10/774 |
| 2021/0201147 | A1* | 7/2021 | Tu | G06F 18/2148 |

FOREIGN PATENT DOCUMENTS

| | | | |
|---|---|---|---|
| CN | 111523575 | 8/2020 | |
| CN | 112203122 | 1/2021 | |
| CN | 112712005 | 4/2021 | |
| CN | 113378784 | 9/2021 | |
| WO | WO-2020215962 A1 * | 10/2020 | ......... G06K 9/00718 |

OTHER PUBLICATIONS

International Search Report and Written Opinion issued in corresponding PCT Patent Application No. PCT/CN2022/096229, dated Jul. 27, 2022.

Office Action issued in corresponding Japanese Patent Application No. 2022-564826, dated Oct. 3, 2023.

European Search Report issued in corresponding European Patent Application No. 22789452.4, dated Oct. 5, 2023.

H. Takeuchi et al., "Generating spectrogram mask for environmental sounds based on dual encoder of sounds and labels", Collection of Lectures from the Japanese Music Society, pp. 365-368 (Mar. 2020).

D. Cao et al., "Hashtag our stories: Hashtag recommendation for micro-videos via harnessing multiple modalities"; Knowledge-Based Systems, vol. 203, pp. 1-11 (Jun. 2020).

H. Tian et al., "Multimodal deep representation learning for video classification", World Wide Web, vol. 22, No. pp. 1325-1341 (May 3, 2018).

* cited by examiner

METHOD OF TRAINING VIDEO TAG RECOMMENDATION MODEL, AND METHOD OF DETERMINING VIDEO TAG

This application is the U.S. national phase entry of PCT Patent Application No. PCT/CN2022/096229 filed on May 31, 2022, which claims the benefit of priority to Chinese Patent Application No. 202110754370.4 filed on Jul. 1, 2021, which is incorporated herein in its entirety by reference.

TECHNICAL FIELD

The present disclosure relates to a field of an artificial intelligence technology, in particular to fields of speech recognition, natural language processing, computer vision and intelligent recommendation technologies, and more specifically to a method and an apparatus of training a video tag recommendation model, a method of determining a video tag, an electronic device, and a storage medium.

BACKGROUND

With a development of computer technology and network technology, video as a carrier of information has been fully developed. In order to provide users with services such as efficient video search and video recommendation, it is generally required to add a tag to a video.

In a related art, a video classification mainly depends on a supervised learning, and the supervised learning generally depends on a large number of labeled data. In a technical solution of determining tags by classifying videos, it is generally needed to pre-define a tag system. If the tag system is adjusted according to real-time requirements, a classification model needs to be retrained.

SUMMARY

The present disclosure provides a method and an apparatus of training a video tag recommendation model, a method of determining a video tag, a device, and a storage medium to improve a model flexibility.

According to an aspect of the present disclosure, a method of training a video tag recommendation model is provided, the video tag recommendation model includes a video feature extraction network and a tag feature extraction network; and the method includes: obtaining a first video feature of a video sample by using the video feature extraction network; inputting a first tag as a positive sample to the tag feature extraction network, so as to obtain a first feature of the first tag; inputting a second tag as a negative sample to the tag feature extraction network, so as to obtain a second feature of the second tag; and training the video tag recommendation model according to the first video feature, the first feature, the second feature, and a predetermined loss function.

According to another aspect of the present disclosure, a method of determining a video tag is provided, including: obtaining a second video feature of a video to be processed, by using a video feature extraction network in a video tag recommendation model; inputting each tag in a predetermined tag library to a tag feature extraction network in the video tag recommendation model, so as to obtain a tag feature of the tag; and determining a target tag in the predetermined tag library as a tag corresponding to the video to be processed, according to a distance between the tag feature of each tag and the second video feature, wherein the video tag recommendation model is trained using the method of training the video tag recommendation model as described above.

According to another aspect of the present disclosure, an apparatus of determining a video tag is provided, including: a second video feature obtaining module configured to obtain a second video feature of a video to be processed, by using a video feature extraction network in a video tag recommendation model; a tag feature obtaining module configured to input each tag in a predetermined tag library to a tag feature extraction network in the video tag recommendation model, so as to obtain a tag feature of the tag; and a tag determination module configured to determine a target tag in the predetermined tag library as a tag corresponding to the video to be processed, according to a distance between the tag feature of each tag and the second video feature, wherein the video tag recommendation model is trained using the apparatus of training the video tag recommendation model as described above.

According to another aspect of the present disclosure, an electronic device is provided, including: at least one processor; and a memory communicatively connected to the at least one processor, wherein the memory stores instructions executable by the at least one processor, and the instructions, when executed by the at least one processor, cause the at least one processor to implement the method of training the video tag recommendation model and/or the method of determining the video tag provided by the present disclosure.

According to another aspect of the present disclosure, a non-transitory computer-readable storage medium having computer instructions therein is provided, and the computer instructions are configured to cause a computer to implement the method of training the video tag recommendation model and/or the method of determining the video tag provided by the present disclosure.

It should be understood that content described in this section is not intended to identify key or important features in embodiments of the present disclosure, nor is it intended to limit the scope of the present disclosure. Other features of the present disclosure will be easily understood through the following description.

BRIEF DESCRIPTION OF THE DRAWINGS

The accompanying drawings are used for better understanding of the solution and do not constitute a limitation to the present disclosure, wherein.

DETAILED DESCRIPTION OF EMBODIMENTS

Exemplary embodiments of the present disclosure will be described below with reference to the accompanying drawings, which include various details of embodiments of the present disclosure to facilitate understanding and should be considered as merely exemplary. Therefore, those of ordinary skilled in the art should realize that various changes and modifications may be made to embodiments described herein without departing from the scope and spirit of the present disclosure. Likewise, for clarity and conciseness, descriptions of well-known functions and structures are omitted in the following description.

The present disclosure provides a method of training a video tag recommendation model, and the video tag recommendation model includes a video feature extraction network and a tag feature extraction network. The training method may include a fused feature obtaining stage, a tag feature obtaining stage, and a model training stage. In the fused feature obtaining stage, a first video feature of a video sample is obtained using the video feature extraction network. In the tag feature obtaining stage, a first tag as a positive sample is input to the tag feature extraction network so as to obtain a first feature of the first tag; and a second tag as a negative sample is input to the tag feature extraction network so as to obtain a second feature of the second tag. In the model training stage, the video tag recommendation model is trained by using the first video feature, the first feature, the second feature and a predetermined loss function.

An application scenario of the methods and apparatuses provided in the present disclosure will be described below with reference to FIG. 1.

Figure 1:
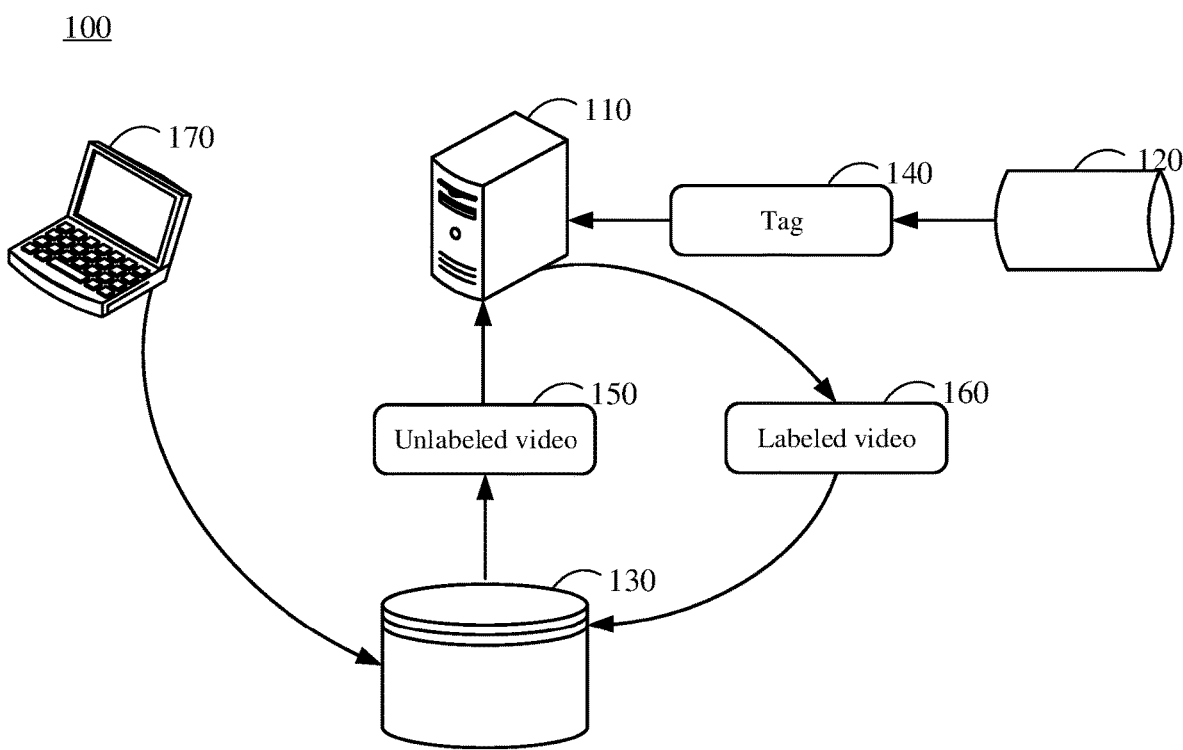
FIG. 1 shows a schematic diagram of an application scenario of a method and an apparatus of training a video tag recommendation model and a method and an apparatus of determining a video tag according to embodiments of the present disclosure.

FIG. 1 shows a schematic diagram of an application scenario of a method and an apparatus of training a video tag recommendation model and a method and an apparatus of determining a video tag according to embodiments of the present disclosure.

As shown in FIG. 1, a scenario 100 of such embodiments includes a server 110, a first database 120, and a second database 130. The server 110 may access the first database 120 and the second database 130, for example, through a network, and the network may include a wired or wireless communication link.

The first database 120 may be, for example, a tag library containing a plurality of tags. The tags in the tag library may be, for example, dynamically adjusted according to actual needs. For example, the plurality of tags may indicate a plurality of keywords extracted from a real-time information hotspot. The server 110 may acquire a tag 140 from the first database 120 by accessing the first database 120.

The second database 130 may be, for example, a video library containing a plurality of videos, and the plurality of videos may include a labeled video and an unlabeled video. The labeled video may refer to a video with a tag. The server 110 may read an unlabeled video 150, for example, from the second database 130, select a matched tag from the first database 120 according to the unlabeled video 150, and label the unlabeled video 150 with the matched tag to obtain a labeled video 160. The server 110 may further store the labeled video 160 in the second database 130.

In embodiments of the present disclosure, the first database 120 and the second database 130 may be, for example, different storage sections in the same database. The second database 130 may have, for example, at least two independent storage spaces for respectively storing the unlabeled video and the labeled video.

In embodiments of the present disclosure, as shown in FIG. 1, the application scenario 100 may further include a terminal device 170, which may interact with the server 110 through the network. The terminal device 170 may access the second database 130, for example, through the network, so as to store a generated video as an unlabeled video in the second database 130.

According to embodiments of the present disclosure, the terminal device 170 may transmit a video acquisition request to the server 110, for example, through an interaction with the server 110. The server 110 may, for example, acquire a matched video from the labeled video in the second database 130, in response to the video acquisition request, and feedback the matched video to the terminal device 170 for display and playback by the terminal device 170.

Exemplarily, the terminal device 170 may be, for example, a desktop computer, a laptop computer, a tablet computer, a smart phone, a smart watch and other electronic devices with a display screen, and various client applications may be installed on the terminal device 170. The server 110 may be, for example, any server supporting a video playback application, such as a server of a distributed system, or a server combined with a block-chain.

It should be noted that the method of training the video tag recommendation model and/or the method of determining the video tag provided by embodiments of the present disclosure may generally be performed by the server 110, or performed by other servers communicatively connected to the server 110. The apparatus of training the video tag recommendation model and/or the apparatus of determining the video tag provided by embodiments of the present disclosure may be provided in the server 110, or provided in other servers communicatively connected to the server 110.

It should be understood that the number and type of server, databases and terminal device in FIG. 1 are just schematic. According to implementation needs, any number and type of servers, databases and terminal devices may be provided.

The method of training the video tag recommendation model provided in the present disclosure will be described in detail below through FIG. 2 to FIG. 6 in combination with FIG. 1.

Figure 2:
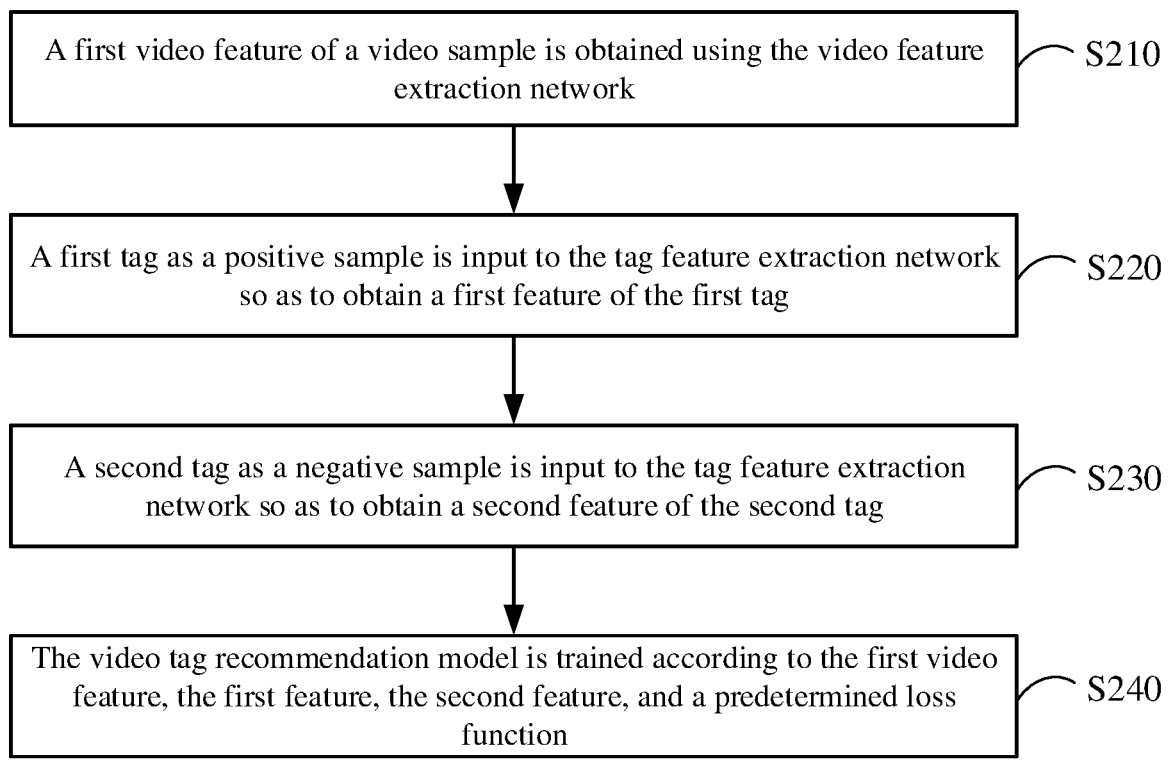
FIG. 2 shows a flowchart of a method of training a video tag recommendation model according to embodiments of the present disclosure.

As shown in FIG. 2, a method 200 of training a video tag recommendation model in such embodiments may include operation S210 to operation S240.

According to embodiments of the present disclosure, the video tag recommendation model may have a video feature extraction network and a tag feature extraction network. The video feature extraction network may extract a video feature by using at least one selected from an image feature extraction model, an audio feature extraction model, and a text feature extraction model, and the tag feature extraction network may extract a tag feature by using a text feature extraction model.

In operation S210, a first video feature of a video sample is obtained using the video feature extraction network.

According to embodiments of the present disclosure, the video feature extraction network may be provided with at least one selected from the image feature extraction model, the audio feature extraction model and the text feature extraction model, so as to extract a feature of the video sample.

In embodiments of the present disclosure, the video feature extraction network may be provided with at least two feature extraction layers, which are respectively provided with feature extraction models for different modalities. When obtaining the first video feature of the video sample, feature vectors in at least two modalities of the video sample may be obtained respectively by using the at least two feature extraction layers. Then the features in the at least two modalities are merged to obtain the first video feature, that is, the first video feature is a fused feature obtained by merging multi-modality features.

The video sample may include a plurality of video frames, audio data corresponding to each video frame, subtitle text data corresponding to each video frame, and title text data of video. The image feature extraction model may extract a feature according to the plurality of video frames, the audio feature extraction model may extract a feature according to the audio data, and the text feature extraction model may extract a feature according to the subtitle text data and/or title text data.

The image feature extraction model may be, for example, a convolutional neural network model, a Markov random field model, or the like. The extracted feature may include at least one selected from: a color feature, a shape feature, a texture feature, and other features. The audio feature extraction model may perform, for example, at least one selected from a short-time Fourier transform, a discrete cosine transform, a discrete wavelet transform, Mel spectrum and Mel cepstrum, a constant Q transform, etc., on an audio to extract an audio feature. The text feature extraction model may be a Bag of Words model, a TF-IDF model or a deep learning model. The deep learning model may be a convolutional neural network, a recurrent neural network, or the like. It may be understood that the image feature extraction model, the audio feature extraction model and the text feature extraction model mentioned above are just used as examples to facilitate understanding of the present disclosure, which is not limited in the present disclosure.

The video feature extraction network may include, for example, a feature fusion layer. When obtaining the features in the at least two modalities, the feature fusion layer may perform operations such as stitching, adding or multiplying the features in the at least two modalities to achieve a fusion of the features in the at least two modalities.

According to embodiments of the present disclosure, in order to facilitate the fusion, the video feature extraction network in such embodiments may further include, for example, fully connected layers one-to-one corresponding to the at least two feature extraction layers. The fully connected layers are connected between the feature extraction layers and the feature fusion layer to convert sizes of the features in the at least two modalities. Accordingly, the feature fusion layer is used to fuse the features converted through the fully connected layers.

In operation S220, a first tag as a positive sample is input to the tag feature extraction network so as to obtain a first feature of the first tag.

According to embodiments of the present disclosure, the tag feature extraction network may be provided with, for example, a text feature extraction model to extract a feature of a tag in a form of text. The text feature extraction model is similar to the text feature extraction model in the aforementioned video feature extraction network. Alternatively, the text feature extraction model in the tag feature extraction network may be a model for extracting a short text feature (such as LSTM model, BERT model, etc.), while the text feature extraction model in the video feature extraction network may be a model for extracting a long text feature (such as BERT+LSTM model, TF-IDF model, etc.).

In such embodiments, the first tag may be input to the tag feature extraction network and processed through the tag feature extraction network to output the first feature.

The first tag as the positive sample may be a tag matched with the video sample. For example, if the video sample is a sports video, the first tag may be "sports". The first tag may be set according to experience, or according to a similarity to a video title. For example, a tag with a similarity greater than 0.9 to the video title may be selected as a positive sample. It may be understood that the 0.9 is just used as an example to facilitate understanding of the present disclosure, which is not limited in the present disclosure.

In operation S230, a second tag as a negative sample is input to the tag feature extraction network so as to obtain a second feature of the second tag.

The operation S230 is similar to the operation S220 described above. The second tag may be input into the tag feature extraction network and processed through the tag feature extraction network to output the second feature. The second tag as the negative sample may be a tag not matched with the video sample. For example, if the video sample is a sports video, the second tag may be "variety" or the like. The second tag may be set according to experience, or according to a similarity to the video title. For example, a tag with a similarity less than 0.5 to the video title may be selected as a negative sample. It may be understood that the 0.5 is just used as an example to facilitate understanding of the present disclosure, which is not limited in the present disclosure.

It may be understood that the operation S230 may be performed, for example, after the operation S220 or before the operation S230. Alternatively, in order to improve a training efficiency, two parameter shared tag feature extraction networks may be provided for the video tag recommendation model during training, and the two networks are respectively used to obtain the first feature of the first tag and the second feature of the second tag. When the training is completed, just one of the two networks is retained for prediction.

In operation S240, the video tag recommendation model is trained according to the first video feature, the first feature, the second feature, and a predetermined loss function.

According to embodiments of the present disclosure, a value of the predetermined loss function may be determined according to the first video feature, the first feature and the second feature. Then, a parameter of each network model in the video tag recommendation model may be adjusted according to the value of the predetermined loss function, a back propagation algorithm or a gradient descent algorithm. By training the video tag recommendation model, the first video feature may be closer to the first feature, and farther from the second feature. In this way, during the prediction, it is possible to select a tag more closely matched with the video from the tag library by using the trained video tag recommendation model.

According to embodiments of the present disclosure, the video sample, the positive sample and the negative sample may form a triplet sample pair, and the predetermined loss function may be a triplet loss function. Accordingly, the value of the loss function may be determined using a method described later, which will not be described in detail here. It may be understood that a type of the predetermined loss function is just used as an example to facilitate understanding of the present disclosure, as long as the value of the predetermined loss function is positively related to a distance between the first video feature and the first feature, and negatively related to a distance between the first video feature and the second feature.

As mentioned above, in embodiments of the present disclosure, an association between the video feature and the tag feature may be learned by providing the video tag recommendation model having the video feature extraction network and the tag feature extraction network and by training the video tag recommendation model according to the feature of the positive sample and the feature of the negative sample. During training, there is no need to rely on an accuracy of labeling video samples, to clearly and separately define tags, or to consider a description granularity between tags. Furthermore, by building a video tag recommendation model that extracts multi-modality fusion features of video samples, it is possible to extract a video feature with a stronger generalization ability that may express the video more accurately. In general, the video tag recommendation model trained by the training method of such embodiments has better flexibility and accuracy, is especially suitable for a scenario in which a topic focus changes rapidly, and may efficiently determine a video tag.

Figure 3:
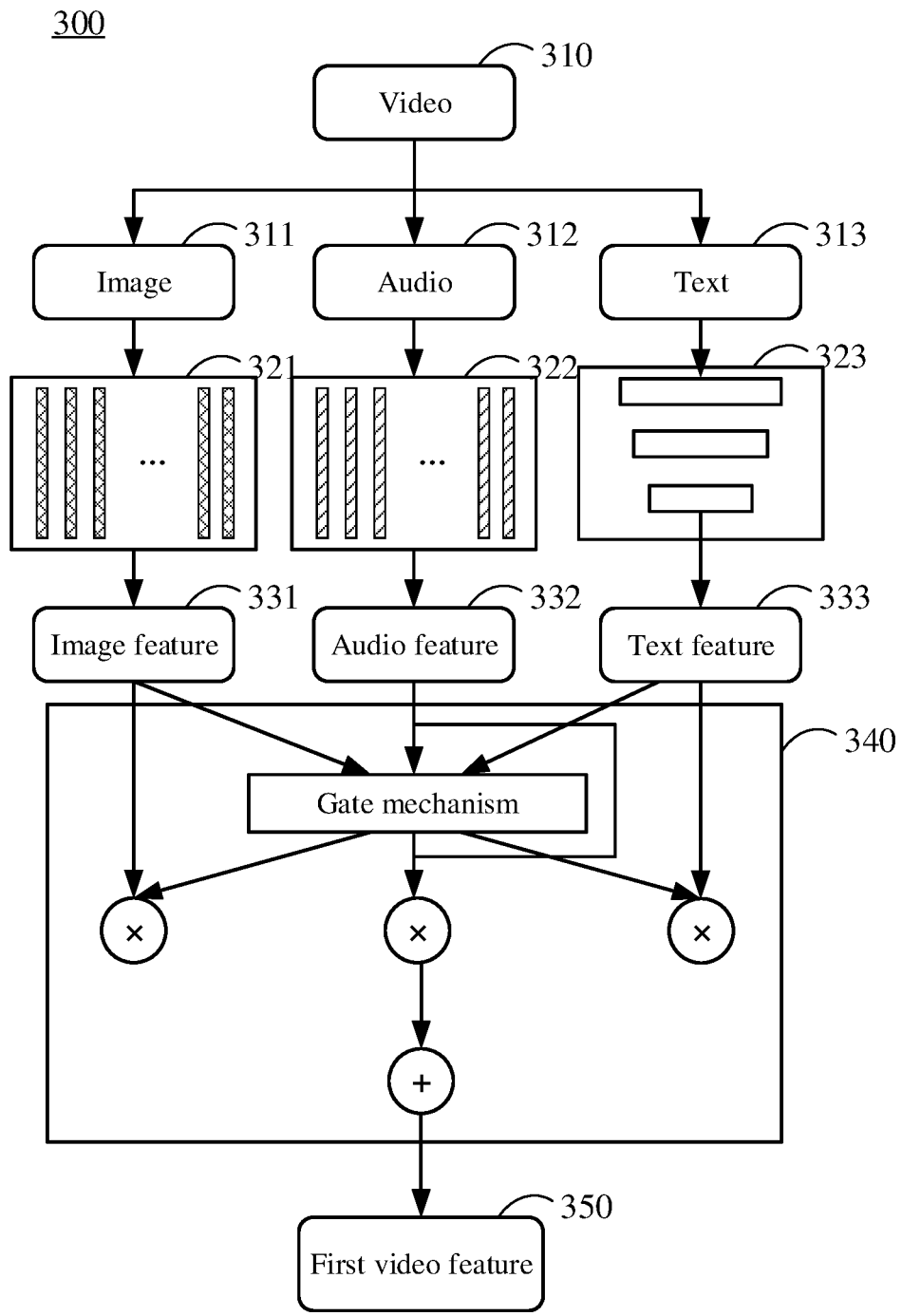
FIG. 3 shows a schematic diagram of obtaining a first video feature of a video sample according to embodiments of the present disclosure.

FIG. 3 shows a schematic diagram of obtaining a first video feature of a video sample according to embodiments of the present disclosure.

According to embodiments of the present disclosure, the above-mentioned video feature extraction network may have at least two sub-networks and a feature fusion layer connecting the at least two sub-networks, and each sub-network is provided with a feature extraction layer. When obtaining the first video feature, feature vectors in at least two modalities of the video sample may be obtained respectively using the at least two feature extraction layers provided in the at least two sub-networks. Specifically, the video sample may be input to each of the at least two feature extraction layers and processed by the at least two feature extraction layers to respectively output a feature vector. Then, a weighted fusion may be performed on the feature vectors in the at least two modalities by using the feature fusion layer, so as to obtain a first video feature. Specifically, the feature vectors output from the at least two feature extraction layers may be input to the feature fusion layer to perform a weighted sum on the feature vectors in the at least two modalities according to weight values learned in the feature fusion layer.

Exemplarily, in such embodiments, the at least two feature vectors may be converted into vectors of a same size before the weighted fusion is performed. Accordingly, fully connected layers may be added respectively after the at least two feature extraction layers in the video feature extraction network. A feature vector output from each feature extraction layer may be input to a fully connected layer connected to that feature extraction layer, and an output from the fully connected layer may be input to the feature fusion layer.

Exemplarily, the feature fusion layer may adopt a Mixture of Experts (MoE) to perform a weighted fusion on the feature vectors in the at least two modalities. A specific implementation process may include: compressing dimensions of the at least two feature vectors into a unified dimension, then assigning respective weights to the at least two feature vectors according to an attention mechanism, and finally performing the weighted sum according to the assigned weights. When training the video tag recommendation model, a parameter of the attention mechanism in the MoE may be adjusted at the same time. In this way, a proportion of each modality feature may be flexibly adjusted, so that a video feature that may better express the video is obtained.

The at least two modalities may be two or more modalities, for example. As shown in FIG. 3, in an embodiment 300, the at least two modalities may include an image modality, an audio modality, and a text modality. Specifically, an image 311, an audio 312, and a text 313 in a video 310 as an anchor sample may be input to an image feature extraction model 321, an audio feature extraction model 322, and a text feature extraction model 323, respectively. When the image 311 is processed by the image feature extraction model 321, an image feature 331 may be output. When the audio 312 is processed by the audio feature extraction model 322, an audio feature 332 may be output. When the text 313 is processed by the text feature extraction model 323, a text feature 333 may be output. The image feature 331, the audio feature 332 and the text feature 333 are input to the feature fusion layer 340. The MoE implemented in the feature fusion layer 340 may use each model of the image feature extraction model 321, the audio feature extraction model 322 and the text feature extraction model 323 as an expert model, and then apply a weighted synthesis for a result generated by each expert model, that is, respective weights may be learned for each expert model based on Gate mechanism. The Gate mechanism is used to select which expert model to use. An actual output of the feature fusion layer 340 is a combination of the output of each model and the weight learned by the Gate mechanism, which is the first video feature 350. When training the video tag recommendation model, a loss of parameter optimization of the respective expert models is controlled through the gate mechanism, that is, respective losses may be obtained on the respective expert models for different targets.

According to embodiments of the present disclosure, when extracting the feature vector in the text modality, text data in the video sample may be input to a second feature extraction layer in the at least two feature extraction layers, so that the second feature extraction layer outputs the feature vector in the text modality. The second feature extraction layer is a sub-network with the text feature extraction model.

Exemplarily, BERT model or ERNIE model may be used as the text feature extraction model. In such embodiments, the text data may be converted into a sentence vector with a corresponding feature of [cls] token. The sentence vector is input to the BERT model or ERNIE model and processed by the BERT model or ERNIE model so as to output the text feature.

Exemplarily, a title text in the video sample may be used as an output of the second feature extraction layer so as to obtain the feature vector in the text modality. This is due to a fact that a feature obtained based on subtitle data contains more noise and the data is highly redundant. The method of such embodiments may be implemented to improve an effect of feature modeling and extract the text feature more accurately.

A principle of obtaining the feature vector in the image modality by the image feature extraction model 321 and a principle of obtaining the feature vector in the audio modality by the audio feature extraction model 322 will be described below in detail with reference to FIG. 4 to FIG. 5, respectively.

Figure 4:
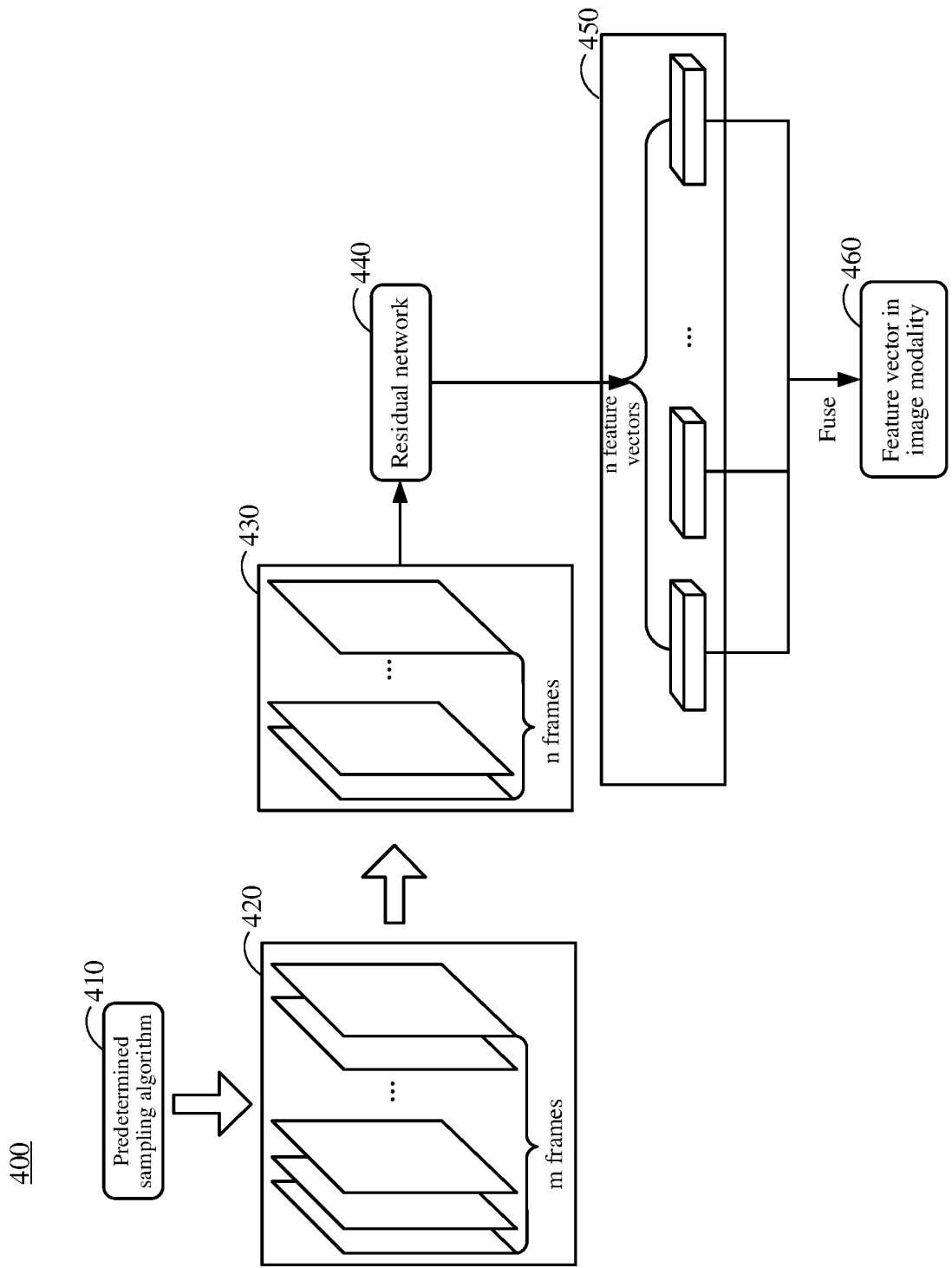
FIG. 4 shows a schematic diagram of determining a feature vector in a video modality according to embodiments of the present disclosure.

FIG. 4 shows a schematic diagram of determining a feature vector in an image modality according to embodiments of the present disclosure.

According to embodiments of the present disclosure, when obtaining the feature vector in the image modality by using the image feature extraction model, each video frame in the video sample may be sequentially input into a first feature extraction layer in the at least two feature extraction layers in a chronological order. The first feature extraction layer is a sub-network provided with the image feature extraction model. The feature vectors of each video frame are sequentially output through the image feature extraction model. Finally, the feature vectors of each video frame are stitched in a chronological order to obtain the feature vector in the image modality.

According to embodiments of the present disclosure, considering that adjacent video frames may have the same features, in order to improve the efficiency of feature extraction on the basis of ensuring accuracy, several video frames may be selected from the video frames, so as to extract feature vectors in the image modality according to the selected video frames. As shown in FIG. 4, an embodiment 400 may be implemented to intensively sample m video images included in a video sample 420 so as to obtain a video frame sequence 430 including n video images. Then, the video frames in the video frame sequence 430 are sequentially input into the image feature extraction model, so as to sequentially output the feature vectors of the video frames from the image feature extraction model. Then, the feature vectors of the video frames are sequentially stitched according to a chronological order so as to obtain the feature vector in the image modality. m and n are natural numbers greater than 1, and n is less than or equal to m.

In embodiments of the present disclosure, the image feature extraction model may extract an image feature by using a residual neural network (ResNet). Specifically, a residual network 440 may be used to extract the feature vector of each video frame in the video frame sequence 430 so as to obtain a feature vector sequence 450. If the video frame sequence 430 includes n video images, the feature vector sequence 450 obtained may include n feature vectors one-to-one corresponding to the n video images. Each feature vector in the feature vector sequence may be fused, so as to obtain a feature vector 460 in the image modality. For example, the image feature extraction model may adopt an RNN model or a pooling in time sequence to fuse the feature vectors of the video frames.

Exemplarily, a predetermined sampling algorithm 410 may be used to extract a video frame from the video sample 420. The predetermined sampling algorithm may be, for example, a sparse sampling algorithm. For example, according to the sparse sampling algorithm, a video may be divided into O time sequence segments evenly, a video image is extracted from each segment randomly, and the video images selected from the O time sequence segments are combined to form a video frame sequence. The video frames in the video frame sequence are stitched in a chronological order and then input into the residual network. Then, the feature vectors output from the residual network are pooled globally in a stitching direction to obtain the feature vector in the image modality. By extracting the video frames using the predetermined sampling algorithm, it is possible to avoid a problem of an increase of computing consumption due to a change of video duration. Furthermore, since a video semantic feature does not require an extraction of detailed features, the sparse sampling algorithm is adopted. With this method, since the number of video segments is fixed, a computation amount of the feature extraction in the image modality is fixed regardless of the video length, so that the problem that the computation amount increases with the video length may be solved. In addition, the global feature has sufficient amount of information for video understanding. O is a natural number greater than 1.

According to embodiments of the present disclosure, a depth behavior recognition architecture may be used to implement an overall process of extracting the video frame using the predetermined algorithm, extracting the feature using the residual network, and fusing the feature vectors of each video frame using the RNN model or the pooling in time sequence. The deep behavior recognition architecture may be, for example, a temporal segment network (TSN) or a temporal shift module (TSM), which is not limited in the present disclosure.

According to embodiments of the present disclosure, in a case of a long video duration, for example, a video sample may be divided into a plurality of video segments in advance. Then, at least one video frame is extracted from each of the plurality of video segments by using a predetermined sampling algorithm. For example, according to the predetermined sampling algorithm, each video segment may be divided into O sub-segments evenly, and a video image is extracted from each of the O sub-segments randomly. If the video sample is evenly divided into P video segments in advance, P×O video frames may be obtained finally. In this way, it is possible to avoid a problem that too few video images are sampled so that the video may not be fully expressed. P is a natural number greater than 1.

Figure 5:
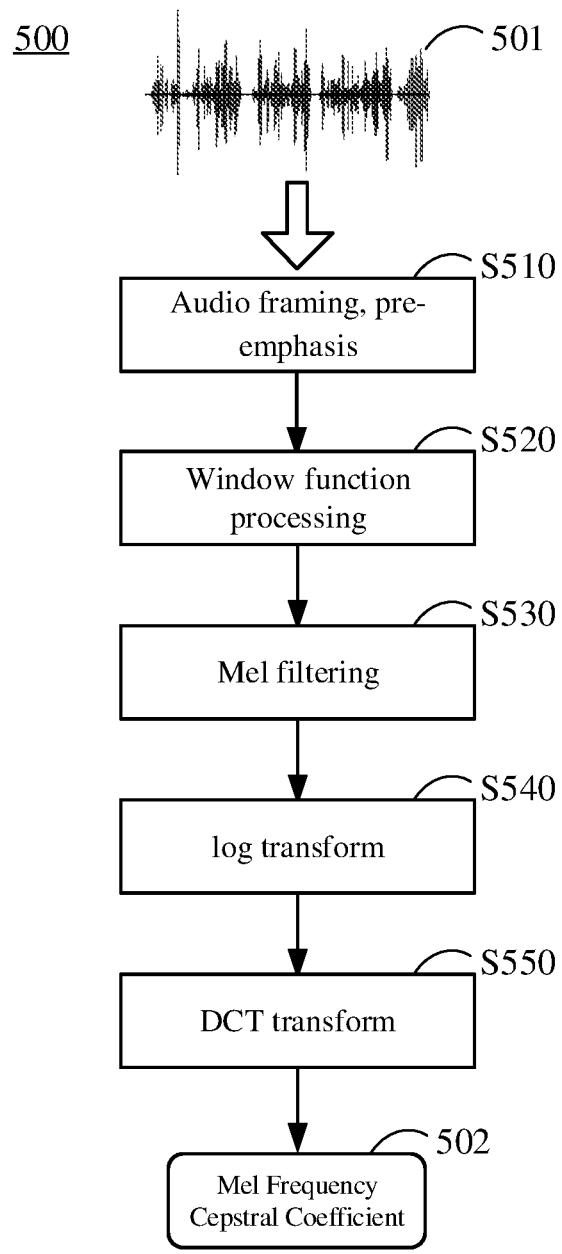
FIG. 5 shows a schematic diagram of determining a feature vector in an audio modality according to embodiments of the present disclosure.

FIG. 5 shows a schematic diagram of determining a feature vector in an audio modality according to embodiments of the present disclosure.

According to embodiments of the present disclosure, the extracted feature vector in the audio modality may be, for example, Mel Frequency Cepstral Coefficient. When extracting the feature vector in the audio modality, audio data of the video sample may be input to a third feature extraction layer in the at least two feature extraction layers, which is a sub-network with the audio feature extraction model, so as to obtain Mel Frequency Cepstral Coefficient of the audio data as the feature vector in the audio modality.

As shown in FIG. 5, in an embodiments 500, a process of extracting Mel Frequency Cepstral Coefficient by the third feature extraction layer may include operation S510 to operation S550.

In operation S510, an audio framing operation and a pre-emphasis operation are performed on audio data 501 of a video sample. Considering a slow change in the audio data, the audio data may be sliced, that is, divided into frames. The audio data in frames may be regarded as an approximate stationary random process. Generally, a time interval of framing may be 10~30 ms. The pre-emphasis process may be used to enhance an amplitude of high-frequency components and highlight a high-frequency resonant peak.

In operation S520, a window function processing is performed on the audio data processed by framing and pre-emphasis. Specifically, a windowing processing may be performed on the multi-frame audio data obtained by framing. For example, the audio data may be multiplied by a Hamming window to implement the window function processing. After the window function processing is performed, for example, a short-time Fourier transform may be performed on the audio data to map the audio data to a linear frequency. Because a result obtained by the short-time Fourier transform is a complex, this embodiment may be implemented to determine an absolute value or a square value of the audio data mapped to the linear frequency so as to obtain a linear frequency spectrum.

In operation S530, Mel filtering is performed on the obtained linear frequency spectrum. A set of Mel filters may be pre-designed to filter the linear frequency spectrum and an energy of each Mel filter may be calculated.

In operation S540, a log transform is performed on the calculated energy of Mel filter to obtain a result approximate to a homomorphic transformation.

In operation S550, a discrete cosine transform (DCT) is performed on the result approximate to the homomorphic transformation so as to obtain Mel Frequency Cepstral Coefficient 502. This is because the cepstrum may be obtained by transforming a time domain signal to a frequency domain signal, taking a logarithm on the frequency domain signal and then transforming the signal to the time domain.

According to embodiments of the present disclosure, the audio data may be expressed better by using Mel Frequency Cepstral Coefficient as the feature vector in the audio modality. This is because a frequency band division of Mel Frequency Cepstrum is equidistant on a Mel scale, which approximates an auditory system more closely than a linearly-spaced band used in a normal logarithmic cepstrum.

Figure 6:
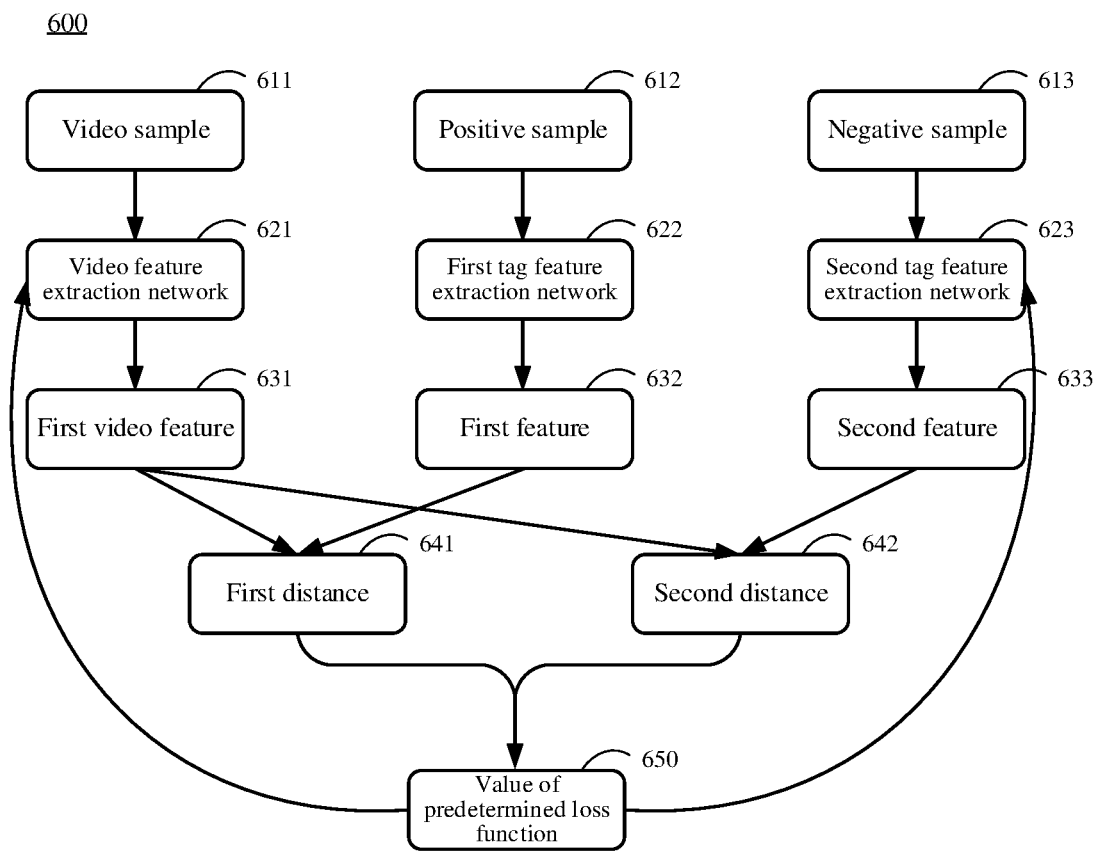
FIG. 6 shows a schematic diagram of a method of training a video tag recommendation model according to embodiments of the present disclosure.

FIG. 6 shows a schematic diagram of a method of training a video tag recommendation model according to embodiments of the present disclosure.

According to embodiments of the present disclosure, as shown in FIG. 6, in an embodiment 600, when training a video tag recommendation model, two parameter-shared tag feature extraction networks (i.e. a first tag feature extraction network 622 and a second tag feature extraction network 623) may be provided for the model.

When training the video tag recommendation model, a video sample 611 may be input into a video feature extraction network 621 of the video tag recommendation model to obtain a first video feature 631. Similarly, a first tag as a positive sample 612 may be input into the first tag feature extraction network 622 and processed by the network so as to obtain a first feature 632. A second tag as a negative sample 613 may be input into the second tag feature extraction network 623 and processed by the network so as to obtain a second feature 633.

Then, a distance between the first feature 632 and the first video feature 631 is determined to obtain a first distance 641, and a distance between the second feature 633 and the first video feature 631 is determined to obtain a second distance 642. The first distance and the second distance may be any distance such as cosine distance, Hamming distance, and Euclidean distance. A value 650 of a predetermined loss function may then be determined according to the first distance 641 and the second distance 642. The video tag recommendation model may be trained according to the value 650 of the predetermined loss function through a back propagation algorithm or a gradient descent algorithm.

According to embodiments of the disclosure, a triplet loss function is taken as an example of the predetermined loss function, and the predetermined loss function may be expressed by the following equation.

$$\text{Loss}(x) = \max(0, d(a, p) - d(a, n) + m)$$

where Loss (x) is a value of the loss function, d(a, p) represents a distance between a first video feature a and a first feature p, d(a, n) represents a distance between the first video feature a and a second feature n, and m is a distance threshold. m may be set according to actual needs, and a value of m generally may be any value greater than 0. A purpose of setting the distance threshold is to ignore a negative sample with a good representation (a distance between the feature and the first video feature is far enough) during training, so that the training pays more attention to sample pairs that are difficult to distinguish, and a training efficiency may be improved.

According to embodiments of the present disclosure, a key point in the training process is how to select the negative sample. If the negative sample is randomly selected for training, the training effect may not be good, and a gradient may be too large or too small, which may bring a great challenge to the training efficiency and stability of the model. When training the video tag recommendation model, according to embodiments of the present disclosure, the first distance between the first feature of the first tag as the positive sample and the first video feature may be determined. A sum of the first distance and a predetermined value is determined as a target distance. Then, a tag is acquired from a predetermined tag library according to the target distance, so that a distance between a feature of that tag and the first video feature is greater than the target distance, so as to obtain a second tag. The predetermined value is a value greater than 0. In embodiments of the present disclosure, the predetermined value may be a value of m mentioned above, which is not limited in the present disclosure. Through the selection of the negative sample, the training efficiency of the model may be improved, and a model with a higher stability may be obtained.

In the process of training the video tag recommendation model, after each round of iteration of the model and weight, a new model may be used to traverse training samples to find a suitable set of negative samples for each anchor sample from the predetermined tag library by using the above-mentioned method, and then randomly select a negative sample from the set of negative samples to be paired with the positive sample.

Exemplarily, the predetermined tag library may be dynamically adjusted and updated according to a real-time hotspot information, so that a tag that may reflect a real-time hotspot more accurately may be determined for the video, which may help recommend the video to users more accurately and improve a user experience.

When the training is completed, any one of the first tag feature extraction network 622 and the second tag feature extraction network 623 may be removed, so as to obtain the video tag recommendation model.

Based on the method of training the video tag recommendation model as described above, the present disclosure further provides a method of determining a video tag. The method will be described in detail below with reference to FIG. 7.

Figure 7:
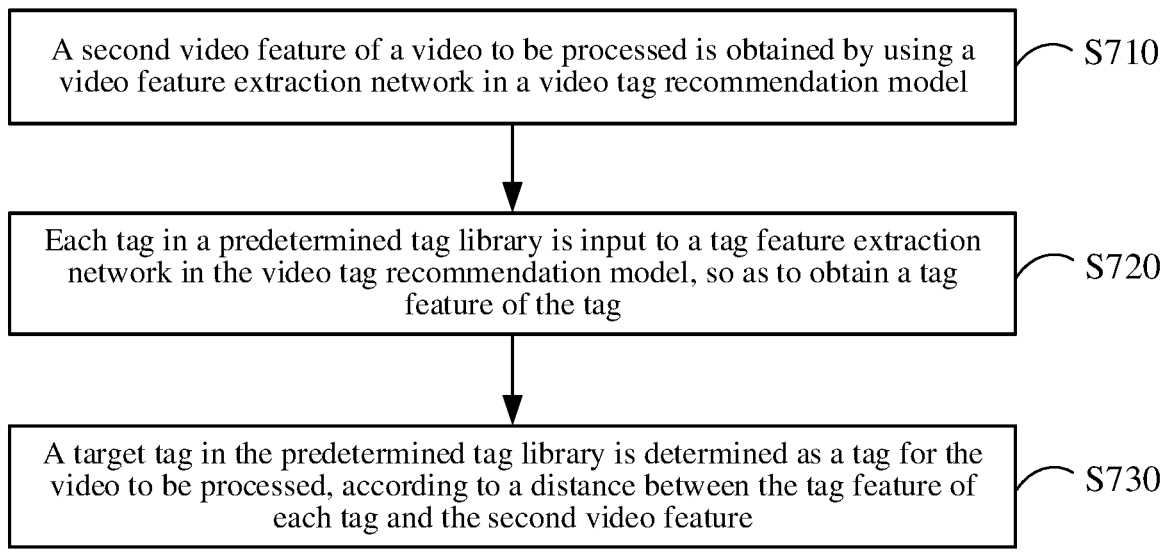
FIG. 7 shows a flowchart of a method of determining a video tag according to embodiments of the present disclosure.

FIG. 7 shows a flowchart of a method of determining a video tag according to embodiments of the present disclosure.

As shown in FIG. 7, a method 700 of determining a video tag in such embodiments may include operation S710 to operation S730.

In operation S710, a second video feature of a video to be processed is obtained by using a video feature extraction network in a video tag recommendation model.

According to embodiments of the present disclosure, the video to be processed may be a video without tag, that is, the above-mentioned unlabeled video. The operation S710 is similar to the operation S210 described above, and the video tag recommendation model is trained by using the method of training the video tag recommendation model as described above, which will not be described in detail here.

In operation S720, each tag in a predetermined tag library is input to a tag feature extraction network in the video tag recommendation model, so as to obtain a tag feature of the tag.

According to embodiments of the present disclosure, the predetermined tag library is similar to the above-mentioned predetermined tag library, and the tags in the predetermined tag library may be input to the tag feature extraction network in sequence to obtain a tag feature sequence. The method of obtaining the tag feature in the operation S720 is similar to the method of obtaining the first feature in the operation S220 described above, which will not be described in detail here.

In operation S730, a target tag in the predetermined tag library is determined as a tag for the video to be processed, according to a distance between the tag feature of each tag and the second video feature.

Such embodiments may be implemented to calculate the distance between each tag feature in the tag feature sequence and the second video feature. A tag corresponding to the tag feature with a smallest distance may be determined as the target tag, or tags corresponding to several tag features with small distances may be determined as the target tags.

In embodiments of the present disclosure, the tags in the predetermined tag library and the video to be processed may be simultaneously input into the video tag recommendation model. When obtaining each tag feature and the second video feature, the video tag recommendation model may calculate the distance between each tag feature and the second video feature, sort the distance, and directly output the target tag according to a sorting result. Alternatively, the video tag recommendation model may output a distance sequence so that the target tag may be determined according to the distance sequence.

As mentioned above, the method of determining the video tag in embodiments of the present disclosure may be implemented to recall a tag matched with a video from the predetermined tag library by using the video tag recommendation model trained by the method described above. Compared with the technical solution of obtaining a tag classification result from a classification model in the related art, the predetermined tag library may be configured dynamically and flexibly, and therefore the video tags may be expanded, so as to improve the real-time and the accuracy of the determined tags.

Based on the method of training the video tag recommendation model provided by the present disclosure, the present disclosure further provides an apparatus of training a video tag recommendation model, which will be described in detail below with reference to FIG. 8.

Figure 8:
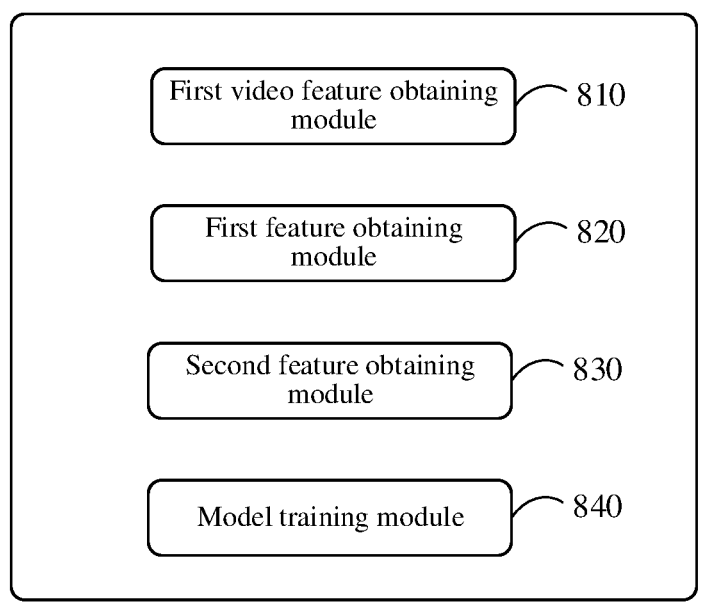
FIG. 8 shows a block diagram of an apparatus of training a video tag recommendation model according to embodiments of the present disclosure.

FIG. 8 shows a structural block diagram of an apparatus of training a video tag recommendation model according to embodiments of the present disclosure.

As shown in FIG. 8, an apparatus 800 of training a video tag recommendation model of such embodiments may include a first video feature obtaining module 810, a first feature obtaining module 820, a second feature obtaining module 830, and a model training module 840. The video tag recommendation model includes a video feature extraction network and a tag feature extraction network.

The first video feature obtaining module 810 may be used to obtain a first video feature of a video sample by using the video feature extraction network. In embodiments of the present disclosure, the first video feature obtaining module 810 may be used to perform the operation S210 described above, which will not be described in detail here.

The first feature obtaining module 820 may be used to input a first tag as a positive sample to the tag feature extraction network, so as to obtain a first feature of the first tag. In embodiments of the present disclosure, the first feature obtaining module 820 may be used to perform the operation S220 described above, which will not be described in detail here.

The second feature obtaining module 830 may be used to input a second tag as a negative sample to the tag feature extraction network, so as to obtain a second feature of the second tag. In embodiments of the present disclosure, the second feature obtaining module 830 may be used to perform the operation S230 described above, which will not be described in detail here.

The model training module 840 may be used to train the video tag recommendation model according to the first video feature, the first feature, the second feature, and a predetermined loss function. In embodiments of the present disclosure, the model training module 840 may be used to perform the operation S240 described above, which will not be described in detail here.

According to embodiments of the present disclosure, the video feature extraction network includes at least two feature extraction layers and a feature fusion layer. The first video feature obtaining module 810 may include a vector obtaining sub-module and a feature obtaining sub-module. The vector obtaining sub-module may be used to respectively obtain feature vectors in at least two modalities of the video sample by using the at least two feature extraction layers. The feature obtaining sub-module may be used to perform a weighted fusion on the feature vectors in the at least two modalities by using the feature fusion layer, so as to obtain the first video feature.

According to embodiments of the present disclosure, the feature obtaining sub-module may include a vector conversion unit, a weight determination unit, and a weighted sum determination unit. The vector conversion unit may be used to convert the feature vectors in the at least two modalities into at least two vectors of a same dimension. The weight determination unit may be used to determine weights assigned to the feature vectors in the at least two modalities, according to an attention mechanism. The weighted sum determination unit may be used to determine a weighted sum of the at least two vectors according to the weights assigned to the feature vectors in the at least two modalities. In a process of training the video tag recommendation model, a parameter of the attention mechanism is dynamically adjustable according to the predetermined loss function.

According to embodiments of the present disclosure, the vector obtaining sub-module may include an image vector obtaining unit used to obtain a feature vector in an image modality using a first feature extraction layer of the at least two feature extraction layers. The image vector obtaining unit may include a frame sequence obtaining sub-unit, a vector sequence obtaining sub-unit, and a feature vector fusion sub-unit. The frame sequence obtaining sub-unit may be used to extract at least two video frames from the video sample by using a predetermined sampling algorithm, so as to obtain a video frame sequence. The vector sequence obtaining sub-unit may be used to extract a feature vector of each video frame in the video frame sequence by using a residual network, so as to obtain a feature vector sequence. The feature vector fusion sub-unit may be used to fuse each feature vector in the feature vector sequence to obtain the feature vector in the image modality.

According to embodiments of the present disclosure, the frame sequence obtaining sub-unit may be used to extract the at least two video frames by: dividing the video sample into a plurality of video segments; and extracting a video frame from each of the plurality of video segments by using the predetermined sampling algorithm, so as to obtain the at least two video frames.

According to embodiments of the present disclosure, the vector obtaining sub-module may include a text vector obtaining unit used to obtain a feature vector in a text modality by: inputting a title text of the video sample to a second feature extraction layer of the at least two feature extraction layers, so as to obtain the feature vector in the text modality.

According to embodiments of the present disclosure, the vector obtaining sub-module may include an audio vector obtaining unit used to obtain a feature vector in an audio modality by: inputting audio data of the video sample to a third feature extraction layer of the at least two feature extraction layers, so as to obtain Mel Frequency Cepstral Coefficient of the audio data as the feature vector in the audio modality.

According to embodiments of the present disclosure, the model training module may include a distance determination sub-module, a value determination sub-module, and a model training sub-module. The distance determination sub-module may be used to determine a distance between the first feature and the first video feature and a distance between the second feature and the first video feature, so as to obtain a first distance and a second distance. The value determination sub-module may be used to determine a value of the predetermined loss function according to the first distance and the second distance. The model training sub-module may be used to train the video tag recommendation model according to the value of the predetermined loss function.

According to embodiments of the present disclosure, the apparatus 800 of training the video tag recommendation model may further include a distance determination module and a tag acquisition module. The distance determination module may be used to determine a sum of a first distance between the first feature and the first video feature and a predetermined value, so as to obtain a target distance. The tag acquisition module may be used to acquire the second tag from a predetermined tag library according to the target distance. A second distance between the second feature of the second tag and the first video feature is greater than the target distance.

Based on the method of determining the video tag provided by the present disclosure, the present disclosure further provides an apparatus of determining a video tag, which will be described in detail with reference to FIG. 9.

Figure 9:
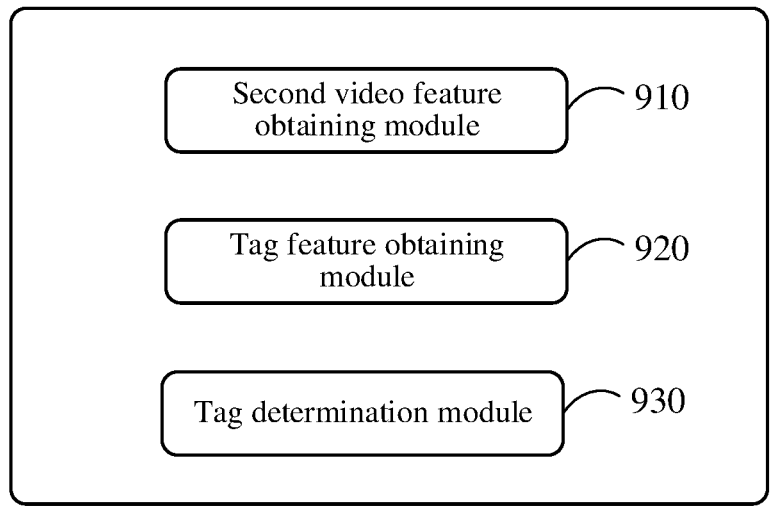
FIG. 9 shows a block diagram of an apparatus of determining a video tag according to embodiments of the present disclosure.

FIG. 9 shows a structural block diagram of an apparatus of determining a video tag according to embodiments of the present disclosure.

As shown in FIG. 9, an apparatus 900 of determining a video tag in such embodiments may include a second video feature obtaining module 910, a tag feature obtaining module 920, and a tag determination module 930.

The second video feature obtaining module 910 may be used to obtain a second video feature of a video to be processed, by using a video feature extraction network in a video tag recommendation model. The video tag recommendation model is trained using the apparatus of training the video tag recommendation model as described above. In embodiments of the present disclosure, the second video feature obtaining module 910 may be used to perform the operation S710 described above, which will not be described in detail here.

The tag feature obtaining module 920 may be used to input each tag in a predetermined tag library to a tag feature extraction network in the video tag recommendation model, so as to obtain a tag feature of the tag. In embodiments of the present disclosure, the tag feature obtaining module 920 may be used to perform the operation S720 described above, which will not be described in detail here.

The tag determination module 930 may be used to determine a target tag in the predetermined tag library as a tag corresponding to the video to be processed, according to a distance between the tag feature of each tag and the second video feature. In embodiments of the present disclosure, the tag determination module 930 may be used to perform the operation S730 described above, which will not be described in detail here.

In the technical solution of the present disclosure, a collection, a storage, a use, a processing, a transmission, a provision, a disclosure and other processing of user personal information involved comply with provisions of relevant laws and regulations, and do not violate public order and good custom.

In the technical solution of the present disclosure, the acquisition or collection of user personal information has been authorized or allowed by users.

According to embodiments of the present disclosure, the present disclosure further provides an electronic device, a readable storage medium, and a computer program product.

Figure 10:
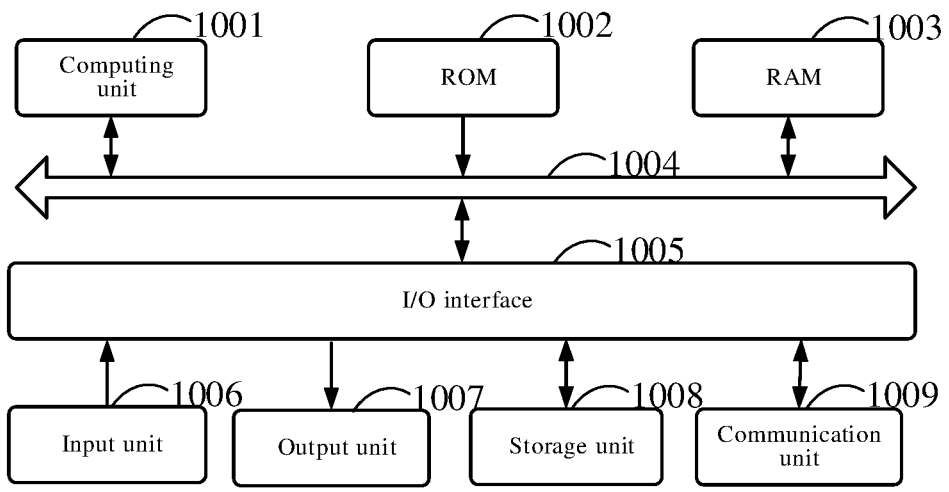
FIG. 10 shows a block diagram of an electronic device for implementing a method of training a video tag recommendation model and/or a method of determining a video tag according to embodiments of the present disclosure.

FIG. 10 shows a schematic block diagram of an exemplary electronic device 1000 for implementing the method of training the video tag recommendation model and the method of determining the video tag of embodiments of the present disclosure. The electronic device is intended to represent various forms of digital computers, such as a laptop computer, a desktop computer, a workstation, a personal digital assistant, a server, a blade server, a mainframe computer, and other suitable computers. The electronic device may further represent various forms of mobile devices, such as a personal digital assistant, a cellular phone, a smart phone, a wearable device, and other similar computing devices. The components as illustrated herein, and connections, relationships, and functions thereof are merely examples, and are not intended to limit the implementation of the present disclosure described and/or required herein.

As shown in FIG. 10, the electronic device 1000 includes a computing unit 1001 which may perform various appropriate actions and processes according to a computer program stored in a read only memory (ROM) 1002 or a computer program loaded from a storage unit 1008 into a random access memory (RAM) 1003. In the RAM 1003, various programs and data necessary for an operation of the electronic device 1000 may also be stored. The computing unit 1001, the ROM 1002 and the RAM 1003 are connected to each other through a bus 1004. An input/output (I/O) interface 1005 is also connected to the bus 1004.

A plurality of components in the electronic device 1000 are connected to the I/O interface 1005, including: an input unit 1006, such as a keyboard, or a mouse; an output unit 1007, such as displays or speakers of various types; a storage unit 1008, such as a disk, or an optical disc; and a communication unit 1009, such as a network card, a modem, or a wireless communication transceiver. The communication unit 1009 allows the electronic device 1000 to exchange information/data with other devices through a computer network such as Internet and/or various telecommunication networks.

The computing unit 1001 may be various general-purpose and/or dedicated processing assemblies having processing and computing capabilities. Some examples of the computing unit 1001 include, but are not limited to, a central processing unit (CPU), a graphics processing unit (GPU), various dedicated artificial intelligence (AI) computing chips, various computing units that run machine learning model algorithms, a digital signal processing processor (DSP), and any suitable processor, controller, microcontroller, etc. The computing unit 1001 executes various methods and processes described above, such as the method of training the video tag recommendation model and the method of determining the video tag. For example, in some embodiments, the method of training the video tag recommendation model and the method of determining the video tag may be implemented as a computer software program which is tangibly embodied in a machine-readable medium, such as the storage unit 1008. In some embodiments, the computer program may be partially or entirely loaded and/or installed in the electronic device 1000 via the ROM 1002 and/or the communication unit 1009. The computer program, when loaded in the RAM 1003 and executed by the computing unit 1001, may execute one or more steps in the method of training the video tag recommendation model and the method of determining the video tag. Alternatively, in other embodiments, the computing unit 1001 may be used to perform the method of training the video tag recommendation model and the method of determining the video tag by any other suitable means (e.g., by means of firmware).

Various embodiments of the systems and technologies described herein may be implemented in a digital electronic circuit system, an integrated circuit system, a field programmable gate array (FPGA), an application specific integrated circuit (ASIC), an application specific standard product (ASSP), a system on chip (SOC), a complex programmable logic device (CPLD), a computer hardware, firmware, software, and/or combinations thereof. These various embodiments may be implemented by one or more computer programs executable and/or interpretable on a programmable system including at least one programmable processor. The programmable processor may be a dedicated or general-purpose programmable processor, which may receive data and instructions from a storage system, at least one input device and at least one output device, and may transmit the data and instructions to the storage system, the at least one input device, and the at least one output device.

Program codes for implementing the methods of the present disclosure may be written in one programming language or any combination of more programming languages. These program codes may be provided to a processor or controller of a general-purpose computer, a dedicated computer or other programmable data processing apparatus, such that the program codes, when executed by the processor or controller, cause the functions/operations specified in the flowcharts and/or block diagrams to be implemented. The program codes may be executed entirely on a machine, partially on a machine, partially on a machine and partially on a remote machine as a stand-alone software package or entirely on a remote machine or server.

In the context of the present disclosure, a machine-readable medium may be a tangible medium that may contain or store a program for use by or in connection with an instruction execution system, an apparatus or a device. The machine-readable medium may be a machine-readable signal medium or a machine-readable storage medium. The machine-readable medium may include, but is not limited to, an electronic, magnetic, optical, electromagnetic, infrared, or semiconductor system, apparatus or device, or any suitable combination of the above. More specific examples of the machine-readable storage medium may include an electrical connection based on one or more wires, a portable computer disk, a hard disk, a random access memory (RAM), a read only memory (ROM), an erasable programmable read only memory (EPROM or a flash memory), an optical fiber, a compact disk read only memory (CD-ROM), an optical storage device, a magnetic storage device, or any suitable combination of the above.

In order to provide interaction with the user, the systems and technologies described here may be implemented on a computer including a display device (for example, a CRT (cathode ray tube) or LCD (liquid crystal display) monitor) for displaying information to the user, and a keyboard and a pointing device (for example, a mouse or a trackball) through which the user may provide the input to the computer. Other types of devices may also be used to provide interaction with the user. For example, a feedback provided to the user may be any form of sensory feedback (for example, visual feedback, auditory feedback, or tactile feedback), and the input from the user may be received in any form (including acoustic input, voice input or tactile input).

The systems and technologies described herein may be implemented in a computing system including back-end components (for example, a data server), or a computing system including middleware components (for example, an application server), or a computing system including front-end components (for example, a user computer having a graphical user interface or web browser through which the user may interact with the implementation of the system and technology described herein), or a computing system including any combination of such back-end components, middleware components or front-end components. The components of the system may be connected to each other by digital data communication (for example, a communication network) in any form or through any medium. Examples of the communication network include a local area network (LAN), a wide area network (WAN), and the Internet.

The computer system may include a client and a server. The client and the server are generally far away from each other and usually interact through a communication network. The relationship between the client and the server is generated through computer programs running on the corresponding computers and having a client-server relationship with each other. The server may be a cloud server, also known as a cloud computing server or a cloud host, which is a host product in a cloud computing service system to solve shortcomings of difficult management and weak business scalability existing in an existing physical host and VPS (Virtual Private Server) service. The server may also be a server of a distributed system or a server combined with a block-chain.

It should be understood that steps of the processes illustrated above may be reordered, added or deleted in various manners. For example, the steps described in the present disclosure may be performed in parallel, in sequence, or in a different order, as long as a desired result for the technical solution of the present disclosure may be achieved. This is not limited in the present disclosure.

The above-mentioned specific embodiments do not constitute a limitation on the scope of protection of the present disclosure. Those skilled in the art should understand that various modifications, combinations, sub-combinations and substitutions may be made according to design requirements and other factors. Any modifications, equivalent replacements and improvements made within the spirit and principles of the present disclosure shall be contained in the scope of protection of the present disclosure.

What is claimed is:

1. A method of training a video tag recommendation model, wherein the video tag recommendation model comprises a video feature extraction network and a tag feature extraction network; and the method comprises:
　obtaining a first video feature of a video sample by using the video feature extraction network;
　inputting a first tag as a positive sample to the tag feature extraction network, so as to obtain a first feature of the first tag, wherein the first tag acting as the positive sample is a tag matched with the video sample in a predetermined tag library;
　inputting a second tag as a negative sample to the tag feature extraction network, so as to obtain a second feature of the second tag, wherein the second tag acting as the negative sample is a tag not matched with the video sample in the predetermined tag library; and
　training the video tag recommendation model according to the first video feature, the first feature, the second feature, and a predetermined loss function, wherein the training the video tag recommendation model comprises:
　　determining a distance between the first feature and the first video feature and a distance between the second feature and the first video feature, so as to obtain a first distance and a second distance;
　　determining a value of the predetermined loss function according to the first distance and the second distance; and
　　training the video tag recommendation model according to the value of the predetermined loss function.

2. The method according to claim 1, wherein the video feature extraction network comprises at least two feature extraction layers and a feature fusion layer;
　the obtaining a first video feature of a video sample by using the video feature extraction network comprises:
　respectively obtaining feature vectors in at least two modalities of the video sample by using the at least two feature extraction layers; and
　performing a weighted fusion on the feature vectors in the at least two modalities by using the feature fusion layer, so as to obtain the first video feature.

3. The method according to claim 2, wherein the performing a weighted fusion on the feature vectors in the at least two modalities by using the feature fusion layer comprises:
　converting the feature vectors in the at least two modalities into at least two vectors of a same dimension;
　determining weights assigned to the feature vectors in the at least two modalities, according to an attention mechanism; and
　determining a weighted sum of the at least two vectors according to the weights assigned to the feature vectors in the at least two modalities,
　wherein, in a process of training the video tag recommendation model, a parameter of the attention mechanism is dynamically adjustable according to the predetermined loss function.

4. The method according to claim 2, wherein the respectively obtaining feature vectors in at least two modalities of the video sample comprises:
　obtaining a feature vector in an image modality using a first feature extraction layer of the at least two feature extraction layers by:
　extracting at least two video frames from the video sample by using a predetermined sampling algorithm, so as to obtain a video frame sequence;
　extracting a feature vector of each video frame in the video frame sequence by using a residual network, so as to obtain a feature vector sequence; and
　fusing each feature vector in the feature vector sequence to obtain the feature vector in the image modality.

5. The method according to claim 4, wherein the extracting at least two video frames from the video sample by using a predetermined sampling algorithm comprises:
　dividing the video sample into a plurality of video segments; and
　extracting a video frame from each of the plurality of video segments by using the predetermined sampling algorithm, so as to obtain the at least two video frames.

6. The method according to claim 2, wherein the respectively obtaining feature vectors in at least two modalities of the video sample comprises:
　obtaining a feature vector in a text modality by:
　inputting a title text of the video sample to a second feature extraction layer of the at least two feature extraction layers, so as to obtain the feature vector in the text modality.

7. The method according to claim 2, wherein the respectively obtaining feature vectors in at least two modalities of the video sample comprises:
　obtaining a feature vector in an audio modality by:
　inputting audio data of the video sample to a third feature extraction layer of the at least two feature extraction layers, so as to obtain Mel Frequency Cepstral Coefficient of the audio data as the feature vector in the audio modality.

8. The method according to claim 1, further comprising:
　determining a sum of a first distance between the first feature and the first video feature and a predetermined value, so as to obtain a target distance; and
　acquiring the second tag from a predetermined tag library according to the target distance,
　wherein a second distance between the second feature of the second tag and the first video feature is greater than the target distance.

9. A method of determining a video tag, the method comprising:
　obtaining a second video feature of a video to be processed, by using a video feature extraction network in a video tag recommendation model;
　inputting each tag in a predetermined tag library to a tag feature extraction network in the video tag recommendation model, so as to obtain a tag feature of the tag;
　determining a target tag in the predetermined tag library as a tag corresponding to the video to be processed, according to a distance between the tag feature of each tag and the second video feature,
　wherein the video tag recommendation model is trained using a training method, wherein the video tag recommendation model comprises the video feature extraction network and the tag feature extraction network and the training method comprises:
　　obtaining a first video feature of a video sample by using the video feature extraction network;

inputting a first tag as a positive sample to the tag feature extraction network, so as to obtain a first feature of the first tag, wherein the first tag acting as the positive sample is a tag matched with the video sample in a predetermined tag library;

inputting a second tag as a negative sample to the tag feature extraction network, so as to obtain a second feature of the second tag, wherein the second tag acting as the negative sample is a tag not matched with the video sample in the predetermined tag library; and training the video tag recommendation model according to the first video feature, the first feature, the second feature, and a predetermined loss function, wherein the training the video tag recommendation model comprises:

determining a distance between the first feature and the first video feature and a distance between the second feature and the first video feature, so as to obtain a first distance and a second distance;

determining a value of the predetermined loss function according to the first distance and the second distance; and training the video tag recommendation model according to the value of the predetermined loss function.

10. An electronic device, comprising:
at least one processor; and
a memory communicatively connected to the at least one processor, wherein the memory stores instructions executable by the at least one processor, and the instructions, when executed by the at least one processor, cause the at least one processor to implement the method according to claim 9.

11. A non-transitory computer-readable storage medium having computer instructions therein, wherein the computer instructions are configured to cause a computer to implement the method according to claim 9.

12. The method according to claim 9, wherein the video feature extraction network comprises at least two feature extraction layers and a feature fusion layer, and the obtaining a first video feature of a video sample by using the video feature extraction network comprises:

respectively obtaining feature vectors in at least two modalities of the video sample by using the at least two feature extraction layers; and performing a weighted fusion on the feature vectors in the at least two modalities by using the feature fusion layer, so as to obtain the first video feature.

13. The method according to claim 12, wherein the performing a weighted fusion on the feature vectors in the at least two modalities by using the feature fusion layer comprises:

converting the feature vectors in the at least two modalities into at least two vectors of a same dimension;

determining weights assigned to the feature vectors in the at least two modalities, according to an attention mechanism; and determining a weighted sum of the at least two vectors according to the weights assigned to the feature vectors in the at least two modalities, wherein, in a process of training the video tag recommendation model, a parameter of the attention mechanism is dynamically adjustable according to the predetermined loss function.

14. The method according to claim 12, wherein the respectively obtaining feature vectors in at least two modalities of the video sample comprises:

obtaining a feature vector in an image modality using a first feature extraction layer of the at least two feature extraction layers by:

extracting at least two video frames from the video sample by using a predetermined sampling algorithm, so as to obtain a video frame sequence;

extracting a feature vector of each video frame in the video frame sequence by using a residual network, so as to obtain a feature vector sequence; and fusing each feature vector in the feature vector sequence to obtain the feature vector in the image modality.

15. The method according to claim 14, wherein the extracting at least two video frames from the video sample by using a predetermined sampling algorithm comprises:

dividing the video sample into a plurality of video segments; and extracting a video frame from each of the plurality of video segments by using the predetermined sampling algorithm, so as to obtain the at least two video frames.

16. The method according to claim 12, wherein the respectively obtaining feature vectors in at least two modalities of the video sample comprises obtaining a feature vector in a text modality by inputting a title text of the video sample to a second feature extraction layer of the at least two feature extraction layers, so as to obtain the feature vector in the text modality.

17. The method according to claim 12, wherein the respectively obtaining feature vectors in at least two modalities of the video sample comprises obtaining a feature vector in an audio modality by inputting audio data of the video sample to a third feature extraction layer of the at least two feature extraction layers, so as to obtain Mel Frequency Cepstral Coefficient of the audio data as the feature vector in the audio modality.

18. The method according to claim 9, further comprising:
determining a sum of a first distance between the first feature and the first video feature and a predetermined value, so as to obtain a target distance; and
acquiring the second tag from a predetermined tag library according to the target distance,
wherein a second distance between the second feature of the second tag and the first video feature is greater than the target distance.

19. A non-transitory computer-readable storage medium having computer instructions therein, wherein the computer instructions are configured to cause a computer system to at least:

obtain a first video feature of a video sample by use of a video feature extraction network, wherein a video tag recommendation model comprises the video feature extraction network and a tag feature extraction network;

input a first tag as a positive sample to the tag feature extraction network, so as to obtain a first feature of the first tag, wherein the first tag acting as the positive sample is a tag matched with the video sample in a predetermined tag library;

input a second tag as a negative sample to the tag feature extraction network, so as to obtain a second feature of the second tag, wherein the second tag acting as the negative sample is a tag not matched with the video sample in the predetermined tag library; and train the video tag recommendation model according to the first video feature, the first feature, the second feature, and a predetermined loss function, wherein the training of the video tag recommendation model comprises:

determination of a distance between the first feature and the first video feature and a distance between the second feature and the first video feature, so as to obtain a first distance and a second distance;

determination of a value of the predetermined loss function according to the first distance and the second distance; and training of the video tag recommendation model according to the value of the predetermined loss function.

20. The non-transitory computer-readable storage medium according to claim 19, wherein the video feature extraction network comprises at least two feature extraction layers and a feature fusion layer; and wherein the instructions configured to cause the computer system to obtain a first video feature of a video sample by use of the video feature extraction network are further configured to cause the computer system to:

respectively obtain feature vectors in at least two modalities of the video sample by use of the at least two feature extraction layers; and perform a weighted fusion on the feature vectors in the at least two modalities by use of the feature fusion layer, so as to obtain the first video feature.

* * * * *